(12) United States Patent
Duffy et al.

(10) Patent No.: US 8,607,237 B2
(45) Date of Patent: Dec. 10, 2013

(54) COLLECTION WITH LOCAL LISTS FOR A MULTI-PROCESSOR SYSTEM

(75) Inventors: John Duffy, Renton, WA (US); Stephen H. Toub, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 985 days.

(21) Appl. No.: 12/131,752

(22) Filed: Jun. 2, 2008

(65) Prior Publication Data

US 2009/0300224 A1    Dec. 3, 2009

(51) Int. Cl.
G06F 9/46    (2006.01)

(52) U.S. Cl.
USPC .......................................................... 718/102

(58) Field of Classification Search
None
See application file for complete search history.

(56) References Cited

U.S. PATENT DOCUMENTS

| | | |
|---|---|---|
| 6,304,924 B1 | 10/2001 | Varma |
| 6,360,220 B1 | 3/2002 | Forin |
| 6,826,757 B2 | 11/2004 | Steele et al. |
| 7,117,502 B1 | 10/2006 | Harris |
| 7,287,131 B1 | 10/2007 | Martin et al. |
| 2003/0182462 A1 | 9/2003 | Moir et al. |
| 2004/0107227 A1 | 6/2004 | Michael |
| 2006/0173885 A1 | 8/2006 | Moir et al. |
| 2007/0143326 A1* | 6/2007 | Chase et al. .................. 707/101 |

OTHER PUBLICATIONS

Terboven et al. (Data and Thread Affinity in OpenMP Programs, May 5, 2008, pp. 377-384).*
Lu, et al., "Parallel XML Processing by Work Stealing", Proceedings of the 2007 workshop on Service-oriented computing performance: aspects, issues, and approaches, Date: Jun. 26, 2007, pp. 31-38.
Maged M. Michael, "High Performance Dynamic Lock-Free Hash Tables and List-Based Sets", Proceedings of the fourteenth annual ACM symposium on Parallel algorithms and architectures, Date: Aug. 10-13, 2002, pp. 73-82.
Purcell, et al., "Non-blocking Hashtables with Open Addressing", University of Cambridge Computer Laboratory, Technical Report No. 639, Date: Sep. 2005, 15 Pages.
Thomas Edward Hart, "Comparative Performance of Memory Reclamation Strategies for Lock-free and Concurrently-readable Data Structures", Masters Thesis, Department of Computer Science, University of Toronto, Date: 2005, 104 Pages.

* cited by examiner

Primary Examiner — Andrew Caldwell
Assistant Examiner — George Giroux

(57) ABSTRACT

A method includes providing a collection that includes a plurality of local lists. Each local list is associated with a different processor or thread in a multi-processor system. An interface to the collection is provided for adding elements to and removing elements from the collection. An add operation is performed with a first processor in the multi-processor system using the interface to add a first element to the collection. The interface is configured to cause the first element to be added to the local list associated with the first processor.

23 Claims, 5 Drawing Sheets

COLLECTION WITH LOCAL LISTS FOR A MULTI-PROCESSOR SYSTEM

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment uses local lists (e.g., processor local lists or thread local lists) to build a collection for a multi-processor system that is scalable and that provides lock freedom or limited lock freedom to reduce or eliminate contention between processors.

In one embodiment, a collection is provided that includes a plurality of local lists. Each local list is associated with a different processor or thread of execution in a multi-processor system. An interface to the collection is also provided for adding elements to and removing elements from the collection. An add operation is performed by a processor or thread in the multi-processor system using the interface to add an element to the collection The interface causes the element to be added to the local list associated with the processor or thread. A remove operation is performed with a processor or thread using the interface to remove an element from the collection. The interface causes the element to be removed from the local list associated with the processor or thread, or if the remove is not successful, the interface causes the element to be removed from the local list associated with another processor or thread.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that generates and uses concurrent collections for a multi-processor system, but the technologies and techniques described herein also serve other purposes in addition to these. In one implementation, one or more of the techniques described herein can be implemented as features within a framework program such as MICROSOFT® .NET Framework, or within any other type of program or service.

Data parallel systems typically operate by partitioning input data into disjoint subsets (partitions) so that independent tasks of execution may process the separate subsets in isolation. The partitions are processed in parallel by multiple processors to generate a plurality of output sets. The output sets are merged back into a merged output set.

Lock freedom is often useful in parallel programs because it offers: (1) Increased scalability due to the fine granularity of synchronization (often just a single, atomic write); (2) better reliability because failure inside of the critical region will not happen; (3) typically, no blocking, meaning that the failure of one thread is caused directly by the success of another thread. The lack of blocking can mean that there are fewer induced context switches, which are pure overhead and are known to lead to increased convoys in lock-based systems.

Various collection types include stacks, queues, sets, dictionaries, dequeues, as well as others. However, these collections are typically ordered and some do not permit duplicates. In addition, these structures typically take a standard approach to building a collection (e.g., using a shared list or array to store elements). The use of a central list inherently limits scalability by forcing all threads to fight for the same elements, and because the cache lines for the storage are typically shared among all threads. Also, when locks are used to provide thread-safety, the threads are forced to contend for the same locks. One embodiment uses local lists (e.g., processor local lists or thread local lists) to diminish these problems. In one embodiment, lock freedom is used to build an unordered, duplicate-allowing collection, which includes local lists to reduce or eliminate contention. One embodiment provides a scalable, lock-free, unordered concurrent collection using work-stealing queues.

Figure 1:
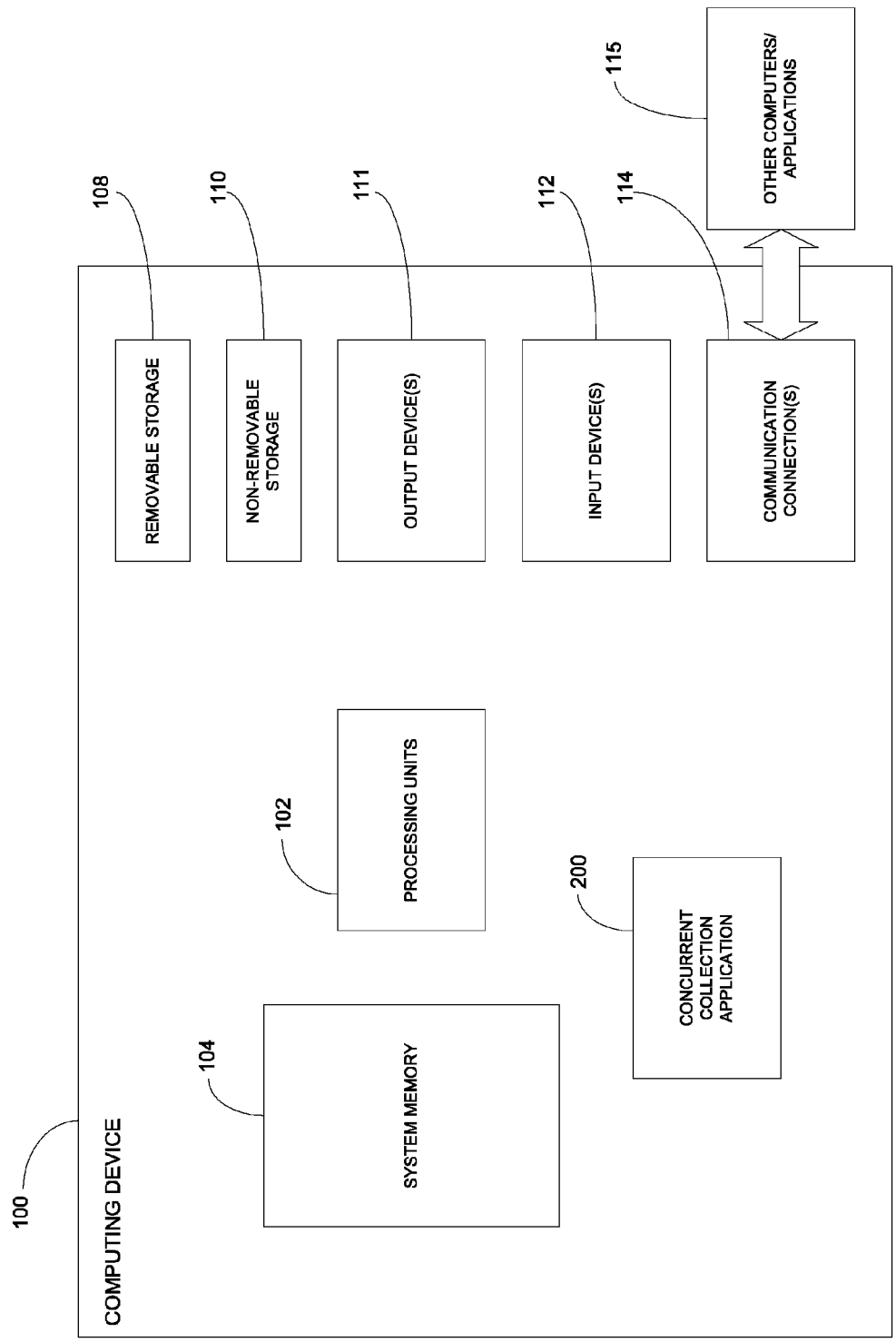
FIG. 1 is a diagram illustrating a computing system suitable for generating and using concurrent collections according to one embodiment.

FIG. 1 is a diagram illustrating a multi-processor computing device 100 suitable for generating and using concurrent collections according to one embodiment. In the illustrated embodiment, the computing system or computing device 100 includes a plurality of processing units (e.g., processors) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and non-volatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100; but excludes any transitory signals. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes concurrent collection application 200. Concurrent collection application 200 is described in further detail below with reference to FIG. 2.

Figure 2:
FIG. 2 is a diagrammatic view of a concurrent collection application for operation on the computer system illustrated in FIG. 1 according to one embodiment.

FIG. 2 is a diagrammatic view of one embodiment of a concurrent collection application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Concurrent collection application 200 includes program logic 202, which is responsible for carrying out some or all of the techniques described herein. Program logic 202 includes logic 204 for generating a concurrent collection that includes a plurality of local lists; interface logic 206 for converting interface commands into corresponding local list commands; interface logic 208 for adding elements to and removing elements from the concurrent collection; interface logic 210 for determining whether identified elements are contained in the concurrent collection; interface logic 212 for determining a total number of elements in the concurrent collection; interface logic 214 for providing random-access to elements in the concurrent collection; and other logic 216 for operating the application.

Figure 3:
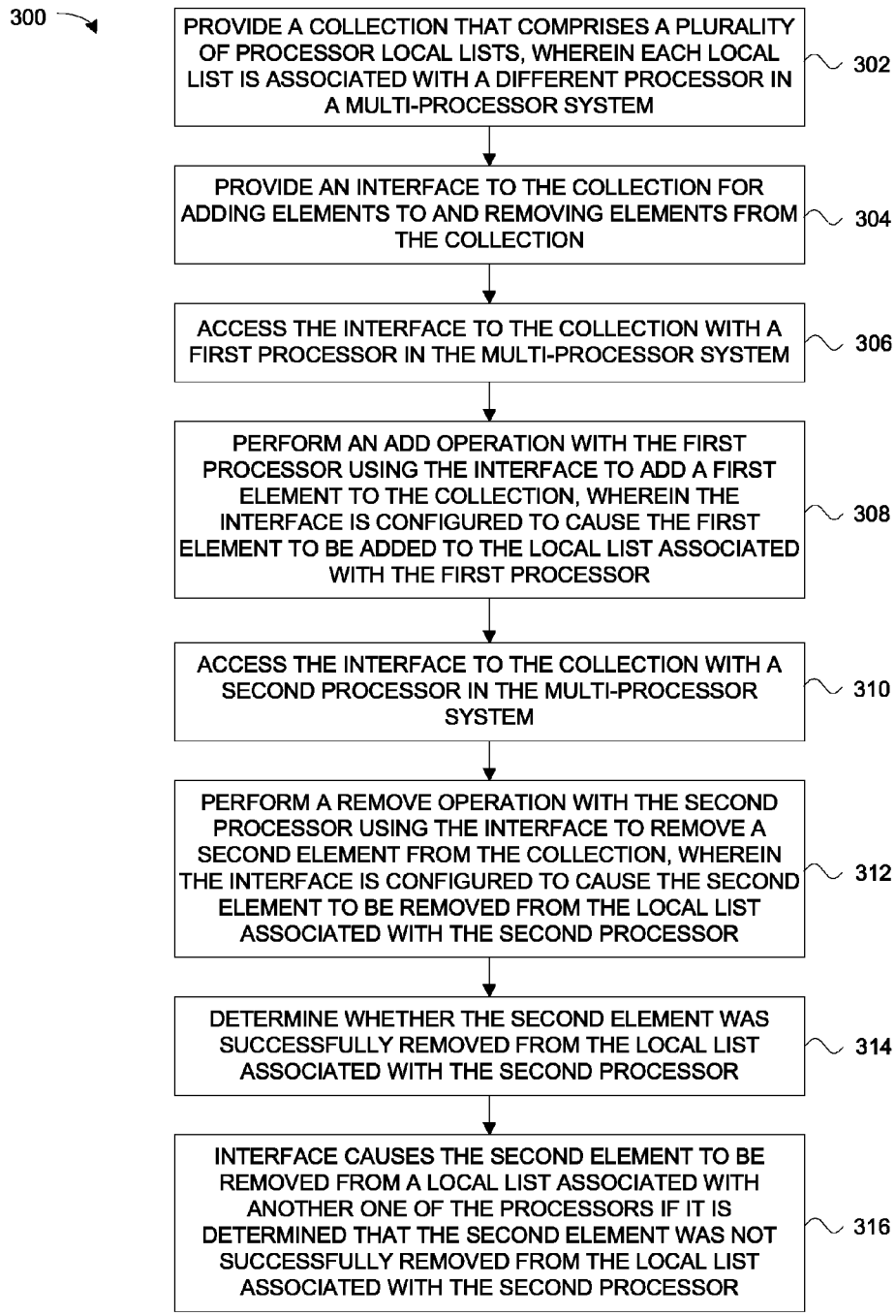
FIG. 3 is a flow diagram illustrating a method for storing data in a multi-processor system using a concurrent collection according to one embodiment.
Figure 4:
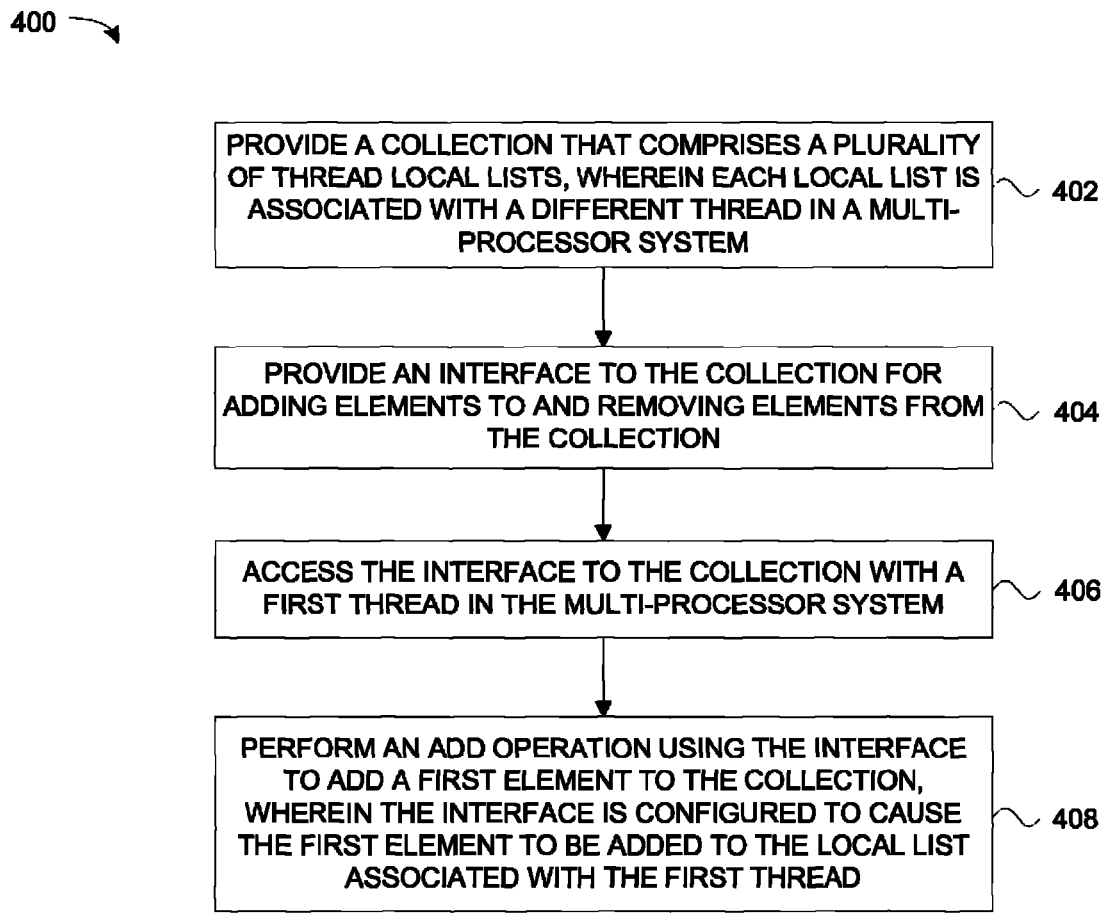
FIG. 4 is a flow diagram illustrating a method for storing data in a multi-processor system using a concurrent collection according to another embodiment.
Figure 5:
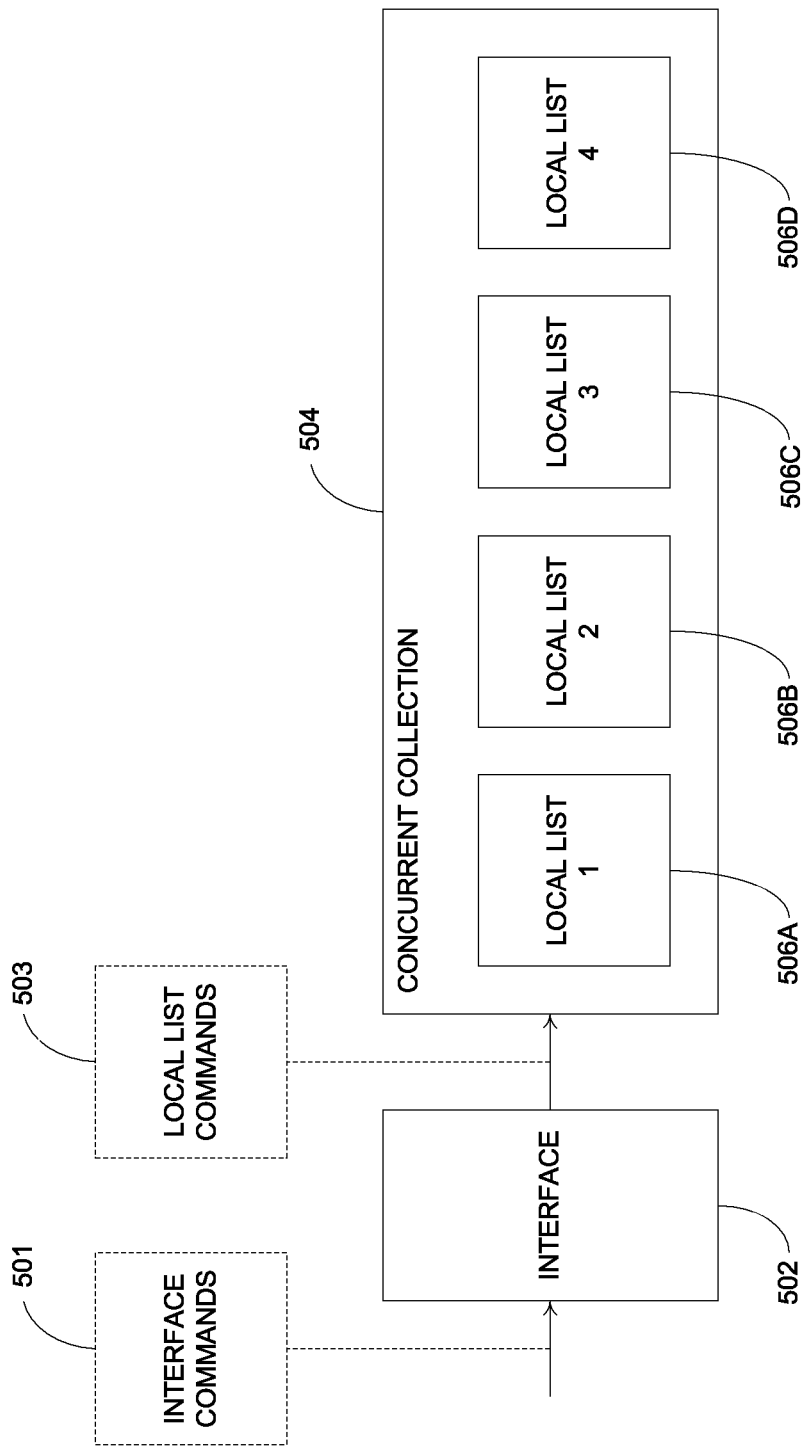
FIG. 5 is a diagram illustrating a concurrent collection and an interface to the concurrent collection according to one embodiment.

Turning now to FIGS. 3-5, methods for implementing one or more embodiments of concurrent collection application 200 are described in further detail. In some implementations, the methods illustrated in FIGS. 3-5 are at least partially implemented in the operating logic of computing device 100.

FIG. 3 is a flow diagram illustrating a method 300 for storing data in a multi-processor system using a concurrent collection according to one embodiment. At 302 in method 300, a collection that comprises a plurality of processor local lists is provided, wherein each local list is associated with a different processor in a multi-processor system. In one embodiment, each local list is associated with a different physical processor in the multi-processor system. In another embodiment, each local list is associated with a different virtual processor in the multi-processor system. At 304, an interface to the collection is provided for adding elements to and removing elements from the collection. At 306, the interface to the collection is accessed by a first processor in the multi-processor system. At 308, the first processor performs an Add operation using the interface to add a first element to the collection, wherein the interface is configured to cause the first element to be added to the local list associated with the first processor. In one embodiment, the interface is configured to cause the first element to be added to the local list associated with the first processor in a lock-free manner.

At 310, the interface to the collection is accessed by a second processor in the multi-processor system. At 312, the second processor performs a Remove operation using the interface to remove a second element from the collection, wherein the interface is configured to cause the second element to be removed from the local list associated with the second processor. In one embodiment, the interface is configured to cause the second element to be removed from the local list associated with the second processor in a lock-free manner. At 314, it is determined whether the second element was successfully removed from the local list associated with the second processor. At 316, the interface causes the second element to be removed from a local list associated with another one of the processors in the system if it is determined at 314 that the second element was not successfully removed from the local list associated with the second processor. In one embodiment, the interface is configured to cause the second element to be removed from the local list associated with another one of the processors at 316 using a lock on the local list.

FIG. 4 is a flow diagram illustrating a method 400 for storing data in a multi-processor system using a concurrent collection according to another embodiment. At 402 in method 400, a collection that comprises a plurality of thread local lists is provided, wherein each local list is associated with a different thread in a multi-processor system. At 404, an interface to the collection is provided for adding elements to and removing elements from the collection. At 406, the interface to the collection is accessed by a first thread in the multi-processor system. At 408, an Add operation is performed using the interface to add a first element to the collection, wherein the interface is configured to cause the first element to be added to the local list associated with the first thread.

FIG. 5 is a diagram illustrating a concurrent collection 504 and an interface 502 to the concurrent collection according to one embodiment. Concurrent collection 504 includes a plurality of local lists 506A-506D (collectively referred to as local lists 506). Concurrent collection 504 according to one embodiment is accessible by and shared by a plurality of processors or threads. In one embodiment, the local lists 506 are processor local lists that are each associated with a different processor in a multi-processor system. In one embodiment, collection 504 includes a number, P, of local lists 506, where P is an integer representing the number of processors in the multi-processor system. In another embodiment, the local lists 506 are thread local lists that are each associated with a different thread in the multi-processor system. In one embodiment, each of the local lists 506 is an ordered list, and the overall concurrent collection 504 comprises an ordered collection (e.g., a collection without an enforced ordering, which allows for duplicates).

In one embodiment, each of the local lists 506 is a queue that operates in a first-in first-out (FIFO) manner. In another embodiment, each of the local lists 506 is a stack that operates in a last-in first-out (LIFO) manner. In another embodiment, each of the local lists 506 is a work-stealing queue that, for example, supports LIFO operations (e.g., push and pop) at the top of the queue, and supports a steal operation at the bottom of the queue. In yet another embodiment, the local lists 506 include any combination of a FIFO queue, a LIFO stack, and a work-stealing queue.

As shown in FIG. 5, access to concurrent collection 504 is provided through interface 502. In one embodiment, interface 502 is configured to receive concurrent collection interface commands 501, convert the interface commands 501 into corresponding local list commands 503, and provide the local list commands 503 to concurrent collection 504. In one embodiment, the format for the local list commands varies depending upon the type of data structure used for local lists 506 (e.g., FIFO queue, LIFO stack, or work-stealing queue). For example, if the local lists 506 are implemented as FIFO queues, interface 502 according to one embodiment converts Add and Remove interface commands 501 to enqueue and dequeue local list commands 503, respectively. As another example, if the local lists 506 are implemented as LIFO stacks, interface 502 according to one embodiment converts Add and Remove interface commands 501 to push and pop local list commands 503, respectively.

In one embodiment, when the locals lists 506 are implemented with work-stealing queues, the interface 502 is configured to perform lock-free Add operations on the work-stealing queues for all of the processors or threads (e.g., in one embodiment, Add operations for each work-stealing queue are only performed for the processor or thread associated with that work-stealing queue, and the Add operations are performed in a lock-free manner), and perform lock-free Remove operations on each work-stealing queue only for the processor or thread associated with that work-stealing queue. In one form of this embodiment, the interface 502 is configured to perform lock-based Remove operations on each work-stealing queue for processors or threads that are not associated with that work-stealing queue. In one embodiment, the work-stealing queues are optimized for Add/Removes from opposite ends of the lists, so that Add operations remain lock free.

In one embodiment, the interface 502 is configured to perform a Contains operation that determines whether an identified element is contained in the collection 504, and a Count operation that determines a total number of elements in the collection 504. In one embodiment, the interface 502 supports random-access to elements in the collection 504.

In one embodiment, collection 504 uses thread local lists (rather than processor local lists) for situations in which a thread using collection 504 can migrate between processors in mid-operation. In another embodiment, such migration issues are addressed by preventing migration of threads among the processors. For operating system code, migration may be prevented by disabling interrupts. For user-mode code, migration may be prevented by affinitizing the threads to run on only specific ones of the processors.

In one embodiment, interface 502 is implemented with an application programming interface (API), such as that shown in the following Pseudo Code Example I:

Pseudo Code Example I

```
public ConcurrentBag<T> {
    public void Add(T elem);
    public bool Contains(T elem);
    public bool TryRemove(out T elem);
    public int Count { get };
}
```

In Example I, "ConcurrentBag<T>" corresponds to the concurrent collection 504 shown in FIG. 5. The interface supports an Add operation (i.e., Add(T elem)) for adding an element to the collection 504; a Contains operation (i.e., Contains(T elem)) that returns a boolean to indicate whether an identified element is contained in the collection 504; a TryRemove operation (i.e., TryRemove(out T elem)) that returns a boolean to indicate whether the identified element was successfully removed and that returns the removed item in the parameter "out T elem" if the removal was successful; and a Count operation (i.e., Count {get}) that indicates the number of elements that are currently in the collection 504. Example implementations of these operations are described in further detail below with pseudo code examples. In one embodiment, the interface 502 is configured to hide the fact that the concurrent collection 504 actually contains a plurality of local lists 506. In one form of this embodiment, the interface 502 includes a private field, such as that shown in the following Pseudo Code Example II:

Pseudo Code Example II private ImplCollection<T>[ ] lists=new ImplCollection<T>[ProcessorCount];

In Example II, ProcessorCount represents the number of processors in the multi-processor system, and "lists" correspond to the local lists 506 shown in FIG. 5. Thus, the number of lists 506 that are included in collection 504 according to one embodiment is the same as the number of processors in the multi-processor system, with each list corresponding to or associated with one of the processors.

In one embodiment, collection 504 is an unordered collection, and because order does not matter in this embodiment, interface 502 is free to store elements anywhere in the overall collection 504 (e.g., in any of the local lists 506) without the entity that is using the collection 504 knowing where within the collection 504 the elements were stored. For example, when an Add operation is performed by a processor in one embodiment, interface 502 will add the element to the local list 506 associated with that processor, as shown by the following Pseudo Code Example III:

Pseudo Code Example III

```
public void Add(T elem) {
    lists[MyProcessor].Add(elem);
}
```

As shown in Example III, the Add operation adds an element (elem) to the list associated with the current processor (MyProcessor). Performing Add operations in this manner avoids contention issues between processors. When a Remove operation is performed by a processor according to one embodiment, interface 502 will "prefer" to take the element from the local list 506 for that processor, but in the case that the local list 506 for that processor is empty, the interface 502 will search the local lists 506 for the other processors in order to find an element to remove, as shown by the following Pseudo Code Example IV:

Pseudo Code Example IV

```
public bool TryRemove(out T elem) {
    for (int i = MyProcessor; i < ProcessorCount; i++)
        if (TryRemove(out elem)) return true;
    for (int i = 0; i < MyProcessor; i++)
        if (TryRemove(out elem)) return true;
    return false;
}
```

In Example IV, interface 502 first attempts to take an element from the local list 506 for the current processor (MyProcessor), and then, if that fails, walks through the rest of the local lists 506. In one embodiment, interface 502 is configured to lock a local list 506 if the list is not associated with the current processor. In one embodiment, the Contains operation in Pseudo Code Example I is implemented similarly to the TryRemove operation given in Pseudo Code Example IV, except the Contains operation looks through all of the local lists for a specific element, rather than removing the next element from whichever list has one. In one embodiment, if an element is not within the local list 506 for a given processor, interface 502 begins looking outside of this list 506 by first going to a neighboring processor (e.g., for processor 3, interface 502 next looks at the list 506 for processor 4), instead of, for example, always beginning at the same processor (e.g., processor 0), which helps to distribute the workload more evenly.

In one embodiment, interface 502 supports random access to the elements stored in collection 504, and the local lists 506 also support random access, which provides the ability to search for and remove specific elements. In one embodiment, interface 502 implements a random-access Find and Remove operation as shown in the following Pseudo Code Example V:

Pseudo Code Example V

```
bool FindAndRemove(T elem) {
    for (int i = MyProcessor; i < processorCount; i++)
        if (lists[i].Remove(elem)) return true;
    for (int i = 0; i < MyProcessor; i++)
        if (lists[i].Remove(elem)) return true;
}
```

The pseudo code given in the above examples may vary depending upon the type of data structure used for the local lists 506. For example, if the local lists 506 are implemented with stacks, the code in Pseudo Code Example II might be changed to that given in the following Pseudo Code Example VI:

Pseudo Code Example VI private Stack<T>[ ] lists=new Stack<T>[ProcessorCount];

The code for the operations (e.g., Add, Remove, etc.) may also be changed to be appropriate for the underlying stack data structures. For example, the Add operation given in Pseudo Code Example III might be changed to that given in the following Pseudo Code Example VII:

Pseudo Code Example VII

```
public void Add(T elem) {
    lists[MyProcessor].Push(elem);
}
```

As another example, if the local lists 506 are implemented with queues, the code in Pseudo Code Example II might be changed to that given in the following Pseudo Code Example VIII:

Pseudo Code Example VIII private Queue<T>[ ] lists=new Queue<T>[ProcessorCount];

The code for the operations (e.g., Add, Remove, etc.) may also be changed to be appropriate for the underlying queue data structures. For example, the Add operation given in Pseudo Code Example III might be changed to that given in the following Pseudo Code Example IX:

Pseudo Code Example IX

```
public void Add(T elem) {
    lists[MyProcessor].Enqueue(elem);
}
```

While the number of processors in a system may not change at runtime, the number of threads could. Thus, if thread local lists are being used, in one embodiment, the system will be configured to support storing an arbitrary number of lists and having that set of lists be mutated in a thread-safe manner. For example, instead of using an array, the system can use a thread-safe dictionary mapping thread ID to the thread's list. In one form of this embodiment, when a thread adds to the concurrent collection for the first time, a new list is created and added to the dictionary. In one embodiment, threads retrieve their list from the dictionary by thread ID in order to add and remove elements, and threads enumerate the dictionary's list looking for items to remove when their own list is empty. When a thread goes away, it can remove its list from the dictionary to help with memory management (so that the dictionary does not increase dramatically in size over time as threads come and go).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
   providing a collection that comprises a plurality of processor local lists, each local list associated with a different processor in a multi-processor system;
   providing an interface to the collection for receiving concurrent collection interface commands for adding elements to and removing elements from the collection, wherein the concurrent collection interface commands are directed to the collection itself and not to any specific one of the processor local lists within the collection, and wherein the interface is configured to convert the concurrent collection interface commands for the collection itself into local list commands for the processor local lists; and
   performing an add operation with a first processor in the multi-processor system using the interface to add a first element to the collection, wherein the interface is configured to cause the first element to be added to the local list associated with the first processor.

2. The computer-readable storage medium of claim 1, wherein the interface is configured to cause the first element to be added to the local list associated with the first processor in a lock-free manner.

3. The computer-readable storage medium of claim 1, wherein the method further comprises:
   performing a remove operation with a second processor in the multi-processor system using the interface to remove a second element from the collection, wherein the interface is configured to cause the second element to be removed from the local list associated with the second processor.

4. The computer-readable storage medium of claim 3, wherein the interface is configured to cause the second element to be removed from the local list associated with the second processor in a lock-free manner.

5. The computer-readable storage medium of claim 4, wherein the method further comprises:
   determining whether the second element was successfully removed from the local list associated with the second processor; and
   wherein the interface is configured to cause the second element to be removed from a local list associated with another one of the processors in the multi-processor system if it is determined that the second element was not successfully removed from the local list associated with the second processor.

6. The computer-readable storage medium of claim 5, wherein the interface is configured to cause the second element to be removed from the local list associated with the another one of the processors using a lock on that local list.

7. The computer-readable storage medium of claim 1, wherein the collection is an unordered collection.

8. The computer-readable storage medium of claim 7, wherein the local lists each comprise an ordered local list.

9. The computer-readable storage medium of claim 1, wherein at least one of the processor local lists comprises a queue that operates in a first-in first-out (FIFO) manner.

10. The computer-readable storage medium of claim 1, wherein at least one of the processor local lists comprises a stack that operates in a last-in first-out (LIFO) manner.

11. The computer-readable storage medium of claim 1, wherein at least one of the processor local lists comprises a work-stealing queue.

12. The computer-readable storage medium of claim 11, wherein add operations for each work-stealing queue are only performed for the processor associated with that work-stealing queue and the interface is configured to perform the add operations on each work-stealing queue in a lock-free manner, and wherein the interface is configured to perform lock-free remove operations on each work-stealing queue only for the processor associated with the work-stealing queue.

13. The computer-readable storage medium of claim 12, wherein the interface is configured to perform lock-based remove operations on each work-stealing queue for processors that are not associated with the work-stealing queue.

14. The computer-readable storage medium of claim 1, wherein the interface is configured to perform a contains operation that determines whether an identified element is contained in the collection.

15. The computer-readable storage medium of claim 1, wherein the interface is configured to perform a count operation that determines a total number of elements in the collection.

16. The computer-readable storage medium of claim 1, wherein the method further comprises:
   preventing migration of threads among the processors.

17. The computer-readable storage medium of claim 16, wherein the prevention of the migration of threads further comprises:
   affinitizing the threads to run on specific ones of the processors.

18. The computer-readable storage medium of claim 1, wherein the interface supports random-access to elements in the collection.

19. A method for storing data in a multi-processor system, the method comprising:
   providing a collection that comprises a plurality of processor local lists, each local list associated with a different processor in the multi-processor system;
   accessing an interface to the collection with a first processor in the multi-processor system, wherein the interface is configured to receive concurrent collection interface commands for adding elements to and removing elements from the collection, wherein the concurrent collection interface commands are directed to the collection itself and not to any specific one of the processor local lists within the collection, and wherein the interface is configured to convert the concurrent collection interface commands for the collection itself into local list commands for the processor local lists; and
   performing a lock-free add operation with the first processor using the interface to add a first element to the collection, wherein the interface is configured to cause the first element to be added to the local list associated with the first processor in a lock-free manner.

20. The method of claim 19, wherein the processor local lists each comprises a work-stealing queue.

21. The method of claim 20, wherein the interface is configured to perform lock-free add operations on all of the work-stealing queues for all of the processors in the system, and perform lock-free remove operations on each work-stealing queue for the processor associated with that work-stealing queue.

22. The method of claim 21, wherein the interface is configured to perform lock-based remove operations on each work-stealing queue for processors that are not associated with that work-stealing queue.

23. A computer-readable storage medium storing computer-executable instructions for performing a method comprising:

providing a collection that comprises a plurality of thread local lists, each local list associated with a different thread in a multi-processor system;

providing an interface to the collection for receiving concurrent collection interface commands for adding elements to and removing elements from the collection, wherein the concurrent collection interface commands are directed to the collection itself and not to any specific one of the processor local lists within the collection, and wherein the interface is configured to convert the concurrent collection interface commands for the collection itself into local list commands for the thread local lists;

accessing the interface to the collection with a first thread; and performing an add operation using the interface to add a first element to the collection, wherein the interface is configured to cause the first element to be added to the local list associated with the first thread.

\* \* \* \* \*